(12) United States Patent
Onohara et al.

(10) Patent No.: US 8,768,181 B2
(45) Date of Patent: Jul. 1, 2014

(54) DIFFERENTIAL CODE OPTICAL TRANSMISSION AND RECEPTION DEVICE

(75) Inventors: Kiyoshi Onohara, Tokyo (JP); Hideo Yoshida, Tokyo (JP); Takashi Sugihara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 191 days.

(21) Appl. No.: 13/388,079

(22) PCT Filed: Oct. 6, 2010

(86) PCT No.: PCT/JP2010/067584
§ 371 (c)(1),
(2), (4) Date: Jan. 31, 2012

(87) PCT Pub. No.: WO2011/043398
PCT Pub. Date: Apr. 14, 2011

(65) Prior Publication Data
US 2012/0128368 A1 May 24, 2012

(30) Foreign Application Priority Data

Oct. 9, 2009 (JP) ................. 2009-235152

(51) Int. Cl.
*H04B 10/61* (2013.01)
*H04B 10/40* (2013.01)

(52) U.S. Cl.
USPC ............................ 398/211; 398/136; 398/208

(58) Field of Classification Search
USPC ......................................... 398/208, 211, 136
See application file for complete search history.

(56) References Cited

U.S. PATENT DOCUMENTS

| 8,249,080 B1 * | 8/2012 | Giannakopoulos et al. ................. 370/395.64 |
| 2009/0150707 A1 * | 6/2009 | Drucker et al. ............... 713/401 |
| 2012/0079163 A1 * | 3/2012 | Bennett .......................... 710/316 |
| 2012/0219282 A1 * | 8/2012 | Koganei et al. .................... 398/1 |

FOREIGN PATENT DOCUMENTS

| JP | 2003-218843 A | 7/2003 |
| JP | 2007 166119 | 6/2007 |
| JP | 2009 219097 | 9/2009 |

OTHER PUBLICATIONS

ITU-T G.709 Amendment 3: 100 Gbit/s support, one-stage multiplexing and other improvements; date [May 12, 2010], [retrieved on Oct. 1, 2013]. Retrieved from the Internet <URL: http://www.itu.int/rec/T-REC-G.709-200904-S!Amd3/en>.*

"G.709 3 (for consent)," Editor G.709, 62 Pages (Dec. 1-12, 2008).

(Continued)

*Primary Examiner* — Nathan Curs
(74) *Attorney, Agent, or Firm* — Oblon, Spivak, McClelland, Maier & Neustadt, L.L.P.

(57) ABSTRACT

A differential code optical transmission and reception device including: a digital signal processing optical transceiver that converts information data into an optical signal and transmits it to a communication channel, a reception front end part that receives the optical signal from the communication channel, an O/E conversion part that converts the optical signal received from the communication channel into an electrical signal, a skew correction part that regulates or correct a skew between lanes contained in the electrical signal, a differential decoder that decodes a differential code of the skew corrected electrical signal, and a lane exchange/rotation part that rearranges the electrical signal having passed through the differential decoder into a lane state thereof at the time of transmission in cases where lane exchange has occurred in the communication channel.

6 Claims, 5 Drawing Sheets

(56) References Cited

OTHER PUBLICATIONS

"Serdes Framer Interface Level 5 (SFI-5): Implementation Agreement for 40Gb/s Interface for Physical Layer Devices." Optical Internetworking Forum, pp. 1-62 (Jan. 29, 2002).

International Search Report Issued Dec. 28, 2010 in PCT/JP10/67584 Filed Oct. 6, 2010.

Office Action issued Apr. 23, 2013 in Japanese Patent Application No. 2011-535438 with English language translation.

Osamu Ishida, "40/100GbE technologies and related activities of IEEE standardization", Conference on Optical Fiber Communications, IEEE, Mar. 2009, pp. 1-57 with title page.

* cited by examiner

DIFFERENTIAL CODE OPTICAL TRANSMISSION AND RECEPTION DEVICE

TECHNICAL FIELD

The present invention relates to an optical transmission and reception (transceiver) device for differential code signals which is provided with a pair of optical transport devices connected to each other through a communication channel, and which is applied to a digital communication device such as an optical communication system, and in particular, to a differential code optical transmission and reception device which is improved in optical transmission and reception processing of differential code signals.

BACKGROUND ART

In general, in optical transmission and reception devices (and optical transmission and reception methods), there are applied, as optical modulation methods, On Off Keying (OOK), Binary Phase Shift Keying (BPSK), Differential Phase Shift Keying (Differential PSK: DPSK), Quadrature Phase Shift Keying (QPSK), Differential Quadrature Phase Shift Keying (Differential QPSK: DQPSK), and so on.

In multi-level modulation optical transmission and reception devices to which the above-mentioned optical modulation methods are applied, a technique is used which multiplexes a transmission signal by the use of phase information or a polarized wave state (polarization state), instead of binary values of "1, 0".

At this time, a signal is transmitted in a communication channel using a plurality of logic lanes, but there is a problem in which the signal can not be correctly decoded at a receiver side due to the facts that a difference in transmission time among the lanes, called a skew, may occur during transmission from a transmitter to a receiver, and a swapping or exchange of the lanes may be caused by the input state of polarized waves at a reception front end part.

Accordingly, in the past, there has been proposed a technique called OTN-MLD (Optical Transport Network Multi-Lane Distribution) for regulating such a skew (for example, see a first nonpatent document).

Although the OTN-MLD has a function to correct the lanes which were swapped or exchanged with each other in the reception front end part besides skew correction (deskew), it is necessary to carry out a barrel shift (lane rotation) of a frame alignment signal (FAS) in units of OTUk (k=0, 1, 2, ... ) (Optical Transport Unit) frame at a transmitter side, in order to carry out skew correction as well as lane exchange or correction in the MLD.

This is because in a state before the barrel shift is carried out, an FAS exists only in one certain lane, but in order to measure the skew states of the plurality of lanes at the receiver side, frame alignment signals (FASs) have to exist in all the lanes, respectively, and at the same time, it is necessary to observe the skew states based on changes in the relative positions of the frame alignment signals.

Here, as the signal processing operation of the above-mentioned conventional device, reference will be made to an operation thereof in cases where differential decoding is carried out by means of a reception front end part, a multi-lane synchronization (OTN-MLD) part and a differential decoder part, while taking, as an example, a receiver of a digital signal processing optical transceiver.

First, in the reception front end part, an optical reception signal is separated into an I channel and a Q channel of an X polarized wave component, and is also separated into an I channel and a Q channel of a Y polarized wave component, so that it is thus separated into a total of four channels (four lanes).

In the multi-lane synchronization part, OTUk frames received therein are subjected to "skew correction (deskew)" processing to correct skews between the lanes which are generated in the communication channel and the reception front end part, and at the same time, they are also subjected to "lane exchange" processing to restore the change of lanes generated in the communication channel, the reception front end part and an adaptive equalization filter part, and as well as to "lane rotation" processing to restore the frames which have been barrel shifted for each OTUk frame in the multi-lane distribution part.

After that, the OTUk frames thus processed are inputted to the differential decoder part, but they have already been barrel shifted in units of OTUk frame in the multi-lane synchronization part, so an OTUk frame, which was an I channel of X polarization in its state of "0", becomes a Q channel of X polarization in its state of "1".

Accordingly, on the boundaries of the OTUk frames, signals, of which lanes are different from each other before and after each boundary, will be differentially decoded, and hence, there will be a possibility that the differentially encoded signal may not be decoded in a correct manner.

PRIOR ART REFERENCES

Nonpatent Documents

First Nonpatent Document: ITU-T Recommendation G.709, Geneva, 1-12 Dec. 2008

SUMMARY OF THE INVENTION

Problems to be Solved by the Invention

In cases where the OTN-MLD technique has been used in conventional multi-level modulation optical transmission and reception devices, skew correction, lane exchange and an operation of restoring a barrel shift (lane rotation) are carried out at the same time, so there has been a problem that differential coding could not be decoded in a correct manner.

The present invention has been made in order to solve the problem as referred to above, and has for its object to obtain a differential code optical transmission and reception device which is capable of decoding a differentially encoded signal in a correct manner.

Means for Solving the Problems

A differential code optical transmission and reception device according to this invention resides in a differential code optical transmission and reception device which is applied to an optical communication system to transmit and receive information data by converting it into an optical signal, and which is provided, at a transmission side thereof, with a digital signal processing optical transceiver that converts the information data into the optical signal and transmits it to a communication channel, and at a reception side thereof, with a reception front end part that receives the optical signal from the communication channel, an optical to electric (O/E) conversion part that converts the optical signal received from the communication channel into an electrical signal, a skew correction part that regulates a skew between lanes contained in the electrical signal, a differential decoder that decodes a differential code of the electrical signal which has been skew corrected by the skew correction part, and a lane exchange part that rearranges the electrical signal having passed through the differential decoder into a lane state thereof at the time of transmission in cases where lane exchange has occurred in the communication channel, wherein transmission and reception of the electrical signal are carried out irrespective of whether the electrical signal has been differentially encoded.

Effect of the Invention

According to the present invention, by carrying out differential decoding in the differential decoder part before lane rotation processing is carried out in an OTUk framer, a signal is able to be correctly received even in cases where differential encoding of the received signal has been carried out, so the differentially encoded signal can be decoded in a correct manner.

MODES FOR CARRYING OUT THE INVENTION

First Embodiment

Figure 1:
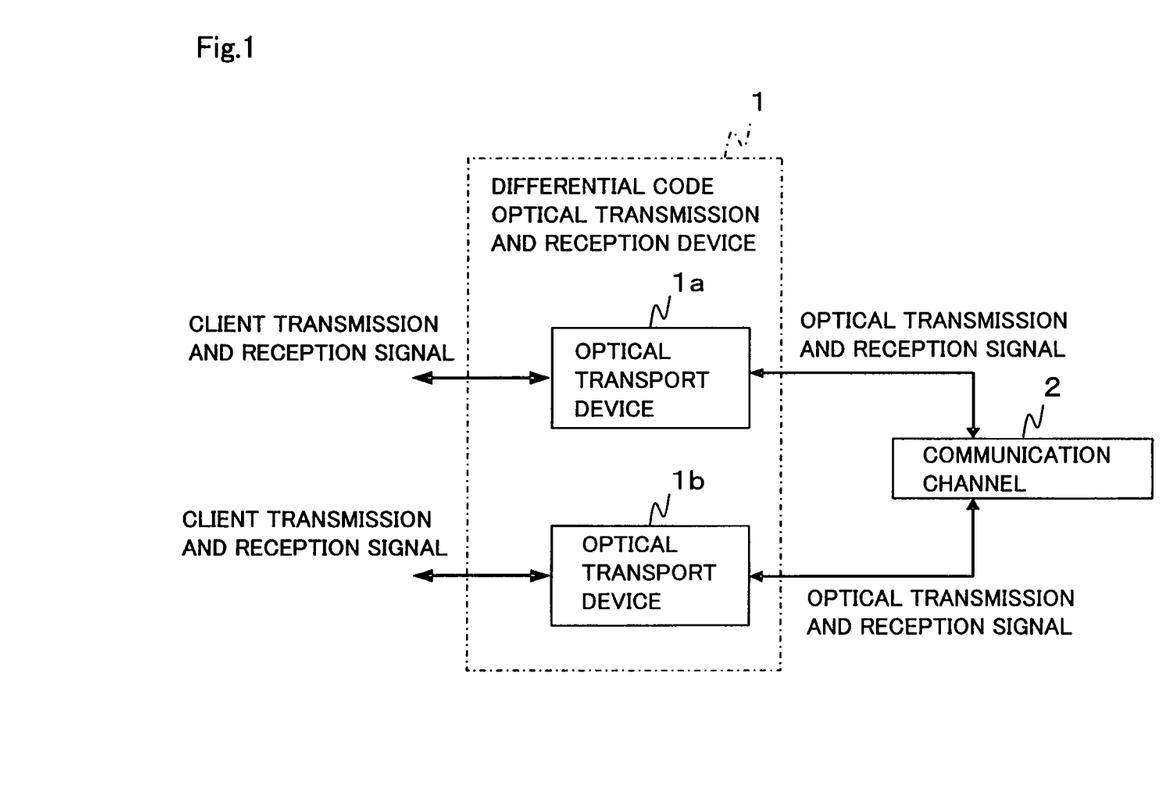
FIG. 1 is a block construction view schematically showing an optical communication system which uses a differential signal optical transmission and reception device according to a first embodiment of the present invention. (First Embodiment)

FIG. 1 is a block construction view schematically showing a system as a whole which uses a differential signal optical transmission and reception device according to a first embodiment of the present invention, wherein a digital optical communication system (hereinafter referred to simply as an "optical communication system") using an FEC (Forward Error Correction) frame construction device is shown as an example.

In FIG. 1, the optical communication system is provided with a differential signal optical transmission and reception device 1 that is composed of a pair of optical transport devices 1a, 1b which carry out transmission and reception of a client signal, and a communication channel 2 (optical fiber) which is inserted between the optical transport devices 1a, 1b, and carries out transmission and reception of an optical signal.

The optical transport devices 1a, 1b are arranged mutually away from each other and each have a transmission and reception function of the same structure, wherein in cases where one of them functions as a receiver, the other functions as a transmitter.

For example, in cases where the optical transport device 1a functions as a receiver for a client transmission (sending) signal, it carries out E/O (electrical to optical) conversion of a transmission signal from a client, and transmits (sends) it to the communication channel 2 as an optical transmission signal, whereas in cases where the optical transport device 1a functions as a transmitter for a client reception signal, it carries out O/E (optical to electrical) conversion of an optical reception signal inputted through the communication channel 2.

Figure 2:
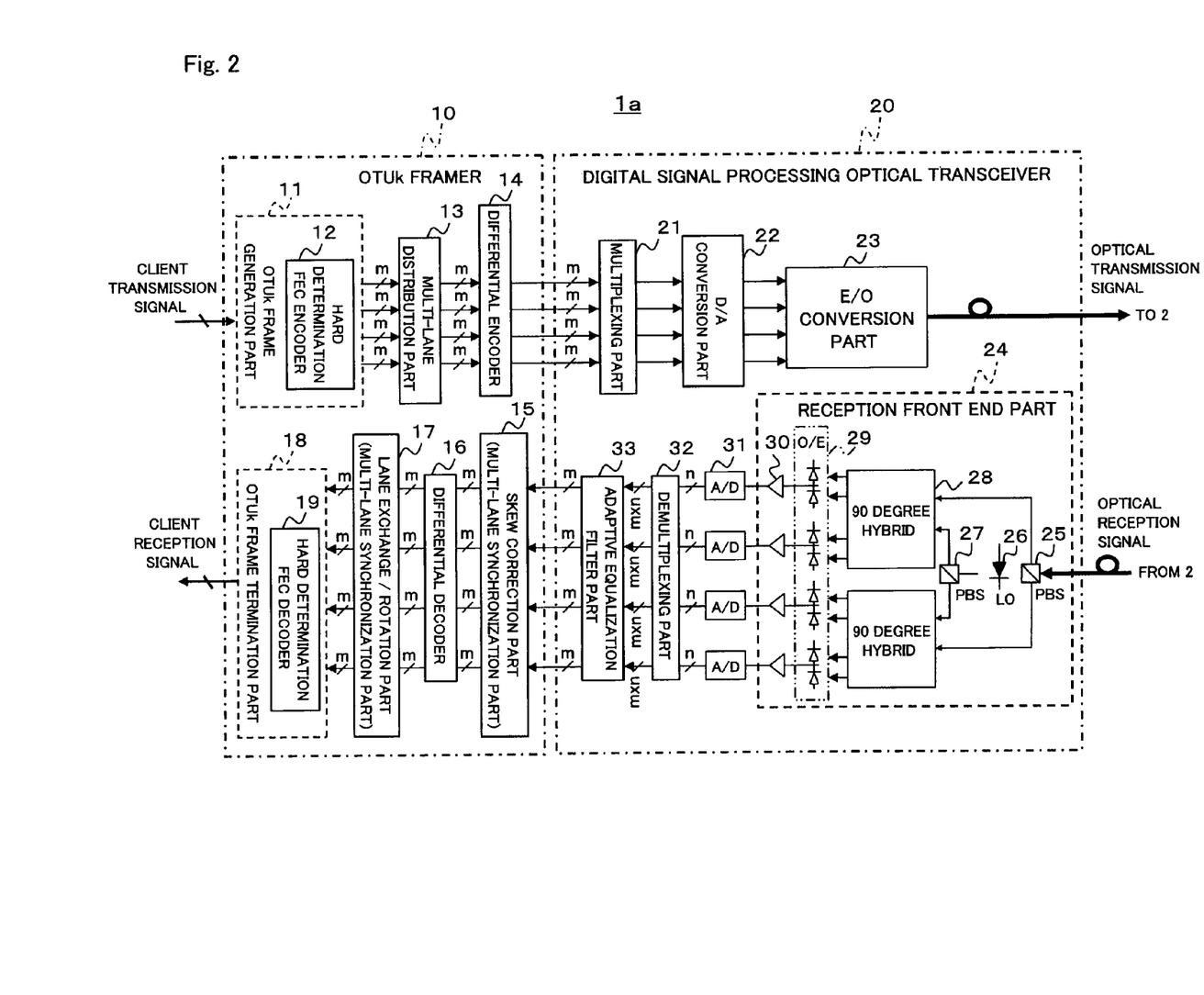
FIG. 2 is a block construction view specifically showing the differential signal optical transmission and reception device according to the first embodiment of the present invention. (First Embodiment)

FIG. 2 is a block construction view specifically showing the differential code optical transmission and reception device 1 (one of the optical transport devices 1a, 1b) in FIG. 1, wherein there is shown a case where the present invention is applied to a multi-level modulation optical transmission and reception device.

Note that herein is representatively shown the functional structure of the optical transport device 1a, but the other optical transport device 1b is identical in structure (i.e., transmission and reception paths are arranged in a reverse manner), so the illustration thereof is omitted.

In addition, although in FIG. 2, the case where the differential signal optical transmission and reception device 1 is applied to the multi-level modulation optical transmission and reception device is shown, it goes without saying that the differential signal optical transmission and reception device 1 can also be applied to other optical transmission and reception devices.

In FIG. 2, the optical transport device 1a, which constitutes the differential signal optical transmission and reception device 1, is provided with an OTUk (Optical channel Transport Unit-k) framer 10, and a digital signal processing optical transceiver 20.

The OTUk framer 10 is provided, as a function of a transmission side, with an OTUk frame generation part 11, a multi-lane distribution part 13, and a differential encoder 14.

In addition, the OTUk framer 10 is also provided, as a function of a reception side, with a skew correction part 15, a differential decoder 16 that decodes differentially encoded signals, a lane exchange/rotation part 17, and an OTUk frame termination part 18.

The OTUk frame generation part 11 is provided with a hard determination FEC encoder part 12, and the OTUk frame termination part 18 is provided with a hard determination FEC decoder 19.

The skew correction part 15 and the lane exchange/rotation part 17 together constitute a multi-lane synchronization (OTN-MLD) part.

The digital signal processing optical transceiver 20 is provided with a multiplexing part 21, a D/A (digital to analog) conversion part 22, an E/O (electrical to optical) conversion part 23, a reception front end part 24, A/D (analog to digital) conversion parts 31, a demultiplexing part 32, and an adaptive equalization filter part 33.

The reception front end part 24 is provided with polarization beam splitters (PBS) 25, 27, a local oscillator (LO) 26 that carries out coherent reception, a pair of 90-degree optical hybrids 28, an O/E (optical to electrical) conversion part 29, and amplifiers (AMPs) 30.

In the OTUk framer 10, the OTUk frame generation part 11 maps a client transmission signal on OTUk frames as data frames, and at the same time, generates optical transmission frames by adding information necessary for frame synchronization and/or maintenance control, and inputs the optical transmission frames to the multi-lane distribution part 13.

The multi-lane distribution part 13 generates OTN-MLD transmission signals by carrying out a barrel shift of the OTUk frames in units of each OTUk frame.

The differential encoder 14 differentially encodes the OTN-MLD transmission signals which have been distributed to multiple lanes, and inputs the OTN-MLD transmission signals thus differentially encoded to the multiplexing part 21 in the digital signal processing optical transceiver 20.

The skew correction part 15 (multi-lane synchronization part) corrects skew between the lanes, which has been generated in the communication channel 2 (transmission line) and the reception front end part 24, with respect to the OTN-MLD reception signals from the adaptive equalization filter part 33 in the digital signal processing optical transceiver 20.

The differential decoder 16 decodes the differentially encoded OTN-MLD reception signals.

The lane exchange/rotation part 17 (multi-lane synchronization part) is provided with a "lane exchange function" to restore the lanes, which have been exchanged with one another in the communication channel 2, the reception front end part 24 and the adaptive equalization filter part 33, to the state of lane arrangement in the transmission state thereof, and a "lane rotation function" to restore the frames barrel shifted for each OTN frame in the multi-lane distribution part 13 to the original states thereof.

As described above, the signals, which have been barrel shifted at the transmission side, are differentially encoded in the differential decoder 16 at the reception side, but at the time of carrying out differential decoding at the reception side, it is necessary to carry out differential decoding before restoring the barrel shifted states of the signals, in order to solve the above-mentioned problem.

Accordingly, in the OTUk framer 10 shown in FIG. 2, the multi-lane synchronization part is divided into two functions, i.e., the skew correction part 15 at the preceding stage and the lane exchange/rotation part 17 at the following stage, through the differential decoder 16.

The OTUk frame termination part 18 terminates the information necessary for frame synchronization and/or maintenance control with respect to the OTUk frames, at the same time, demaps a client reception signal from the OTUk frames, and outputs the client reception signal.

On the other hand, in the digital signal processing optical transceiver 20, the multiplexing part 21 carries out multiplexing processing of m-paralleled (m being 1 or more integer) OTN-MLD transmission signals which have been differentially encoded by means of the differential encoder 14 in the OTUk framer 10, and inputs them to the D/A conversion part 22.

The D/A conversion part 22 carries out D/A conversion of the OTN-MLD transmission signals thus multiplexed by the multiplexing part 21, and inputs them to the E/O conversion part 23.

The E/O conversion part 23 converts the analog signals from the D/A conversion part 22 into an optical signal, and introduces it into the communication channel 2 as an optical transmission signal.

The reception front end part 24 converts an optical reception signal inputted from the communication channel 2 into analog electrical signals, and inputs them to the A/D conversion part 31.

The A/D conversion part 31 converts the analog electrical signals received through the reception front end part 24 into soft determination reception data of n bits (n being 1 or more integer), and inputs them to the demultiplexing part 32.

The demultiplexing part 32 demultiplexes the soft determination reception data of n bits from the A/D conversion part 31 into n×m data (m being equal to the number of multiplexes in the multiplexing part 21), and inputs them to the adaptive equalization filter part 33.

The adaptive equalization filter part 33 carrying out digital signal processing of the reception signals which have been demultiplexed by the demultiplexing part 32, corrects distortion of the reception signals, and inputs them to the skew correction part 15 in the OTUk framer 10.

In the reception front end part 24, the PBS 25, which is arranged at the input side of the LO 26, polarizes and splits the optical signal received from the communication channel 2 into an X polarized wave and a Y polarized wave, and the PBS 27, which is arranged at the output side of the LO 26, polarizes and splits an LO signal from the LO 26.

Each of the 90-degree optical hybrids 28 mixes the optical signal, which has been polarized and split by means of the PBS 25, and the LO signal, which has been polarized and split by means of the PBS 27, with each other, and inputs the signals thus mixed to the O/E conversion part 29.

The O/E conversion part 29 converts the optical signals received through the 90-degree optical hybrids 28 into electrical signals, and inputs them to the AMPs 30.

The AMPs 30 amplify the electrical signals thus O/E converted by the O/E conversion part 29, respectively, and inputs them to the A/D conversion part 31.

Next, reference will be made to a processing operation in cases where an OTN-MLD function is divided according to the first embodiment of the present invention, while referring to FIG. 3.

Figure 3:
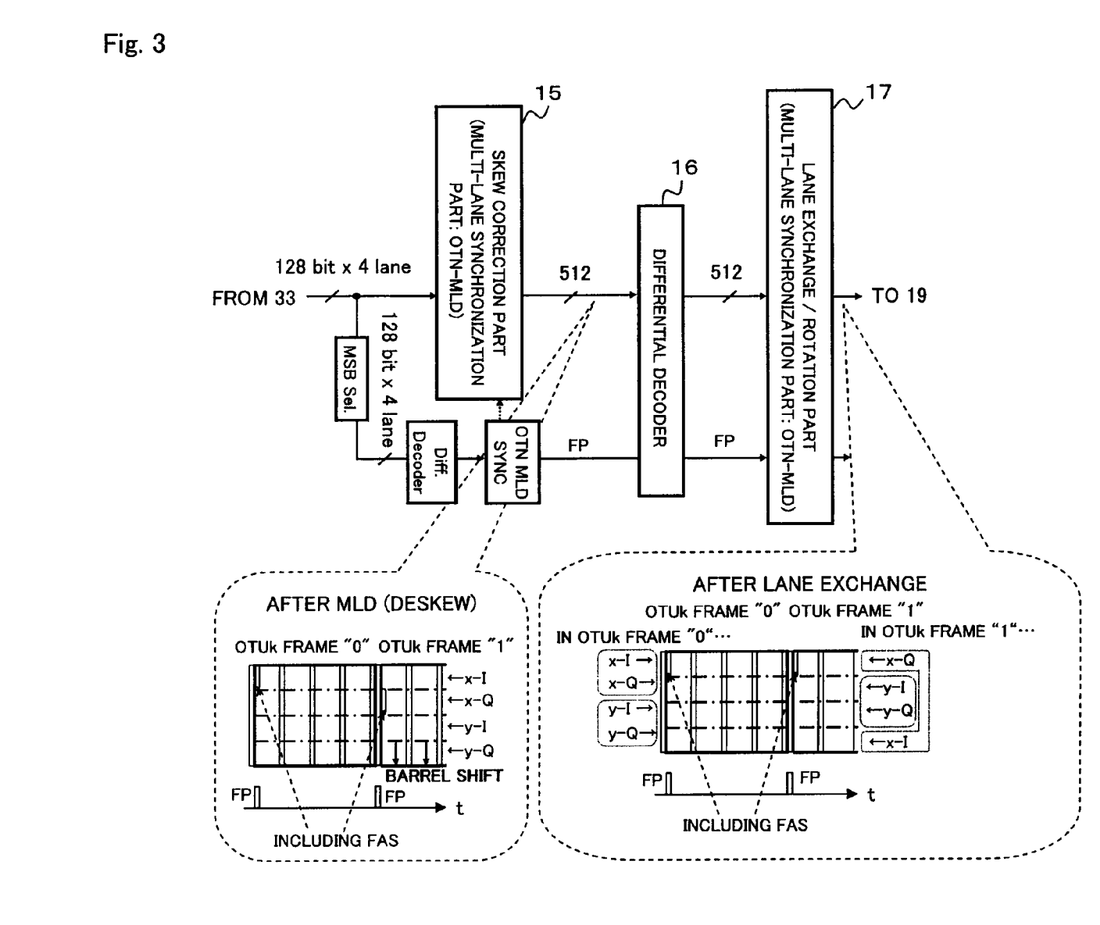
FIG. 3 is an explanatory view showing a reception operation of a multi-lane synchronization part of the differential signal optical transmission and reception device according to the first embodiment of the present invention. (First Embodiment)

FIG. 3 is an explanatory view showing an operation of the multi-lane synchronization part (i.e., the skew correction part 15 and the lane exchange/rotation part 17) in the optical transport device 1*a* (i.e., the multi-level modulation optical transmission and reception device), wherein a case is shown in which a reception signal (electrical signal) which has been subjected to the O/E conversion by means of the digital signal processing optical transceiver 20 has 128 bits (m=128) and 4 lanes (the number of multi-lanes in the multi-lane distribution part).

In addition, in FIG. 3, there are shown specific signal processing flows at a lower side, in parallel to an operation flow corresponding to the respective blocks 15 through 17 at an upper side.

In the signal processing flows, frame pulses FP indicate the heads of individual OTUk frames "0", "1", respectively. Here, "0" and "1" denote the frame numbers of the OTUk frames, respectively.

It is to be noted that the individual signal processing flows are the same as those of the related conventional art, so a detailed description thereof is omitted here.

As stated above, in the transmission side of the differential signal optical transmission and reception device 1, in order to carry out skew correction and lane exchange, it is necessary to carry out barrel shift (lane rotation) of a frame alignment signal (FAS) in units of each OTUk frame, and the transmission signal thus barrel shifted is differentially encoded by the differential encoder 14.

On the other hand, at the time of carrying out differential decoding at the reception side of the differential signal optical transmission and reception device 1, it is necessary to correct only skew between lanes (hereinafter also referred to as lane to lane skew), and to carry out differential decoding before restoring the barrel shifted state of a reception signal.

That is, first, in the reception front end part 24, the reception signal is separated into an I channel and a Q channel of an X polarized wave component, and is also separated into an I channel and a Q channel of a Y polarized wave component, so that it is thus separated into a total of four channels (four lanes).

Hereinafter, the reception signal is inputted to the skew correction part 15 in the OTUk framer 10 through the A/D conversion part 31, the demultiplexing part 32 and the adaptive equalization filter part 33.

In FIG. 3, first of all, the skew correction part 15 in the OTUk framer 10 first carries out only skew correction (deskew) processing in multi-lane synchronization with respect to the reception signal inputted from the adaptive equalization filter part 33 in the digital signal processing optical transceiver 20, so that the skew between the lanes of the reception signal is corrected, and thereafter, the reception signal thus corrected is inputted to the differential decoder 16.

At this time, lane rotation is not carried out in the units of OTUk frame, so in the differential decoder 16, it is possible to receive the reception signal correctly.

Subsequently, the lane exchange/rotation part 17 carries out the "lane exchange" processing to correct those lanes which have been exchanged with each other in the communication channel 2, the reception front end part 24 and the adaptive equalization filter part 33, and the "lane rotation" processing to restore the frames barrel shifted for each OTN frame in the multi-lane distribution part 13 to the original states thereof.

The reception signal, after being restored to the original states of the OTUk frames in this way, is inputted to the OTUk frame termination part 18, where hard determination decoding is carried out thereon by means of the hard determination FEC decoder 19 in the OTUk frame termination part 18, so that the signal thus decoded is transmitted as a client reception signal.

As described above, the differential signal optical transmission and reception device 1 according to the first embodiment (FIG. 1 through FIG. 3) of the present invention resides in a differential code optical transmission and reception device which is applied to an optical communication system to transmit and receive information data by converting it into an optical signal, and which is provided, at a transmission side thereof, with the digital signal processing optical transceiver 20 that converts the information data into the optical signal and transmits it to the communication channel 2.

In addition, the differential signal optical transmission and reception device 1 is provided, at a reception side thereof, with the reception front end part 24 that receives the optical signal from the communication channel 2, the optical to electric (O/E) conversion part 29 that converts the optical signal received from the communication channel 2 into an electrical signal, the skew correction part 15 that regulates a skew between lanes contained in the electrical signal, the differential decoder 16 that decodes a differential code of the electrical signal which has been skew corrected by the skew correction part 15, and a lane exchange part (lane exchange/rotation part 17) that rearranges the electrical signal having passed through the differential decoder 16 into a lane state at the time of transmission in cases where lane exchange has occurred in the communication channel 2.

This serves to divide the skew correction function and the lane exchange function and the lane rotation function (to restore the barrel shift) of OTN-MLD into one another, so that skew correction is first carried out, and thereafter, differential decoding is carried out, after which the lane exchange and lane rotation functions are carried out.

In addition, the optical signal passing through the communication channel 2 is OTUk frames in each of which an error correction bit(s) is added to an information bit(s) by means of the OTUk framer 10.

According to the differential signal optical transmission and reception device 1 of the first embodiment of the present invention, transmission and reception of an electrical signal are carried out with the above-mentioned construction irrespective of whether the electrical signal is differentially encoded or not.

That is, an input signal to the differential signal optical transmission and reception device 1 is inputted thereto, without a differential pair of differentially encoded signals being located at positions away from each other by means of lane rotation, and hence, the differential pair can always be located at adjacent bits, thus making it possible to perform differential encoding in a correct manner.

Here, note that although an explanation has been omitted in the above-mentioned first embodiment, a skew generated between the OTUk framer 10 and the digital signal processing optical transceiver 20 is corrected by means of an SFI (Serdes Framer Interface) in each of the OTUk framer 10 and the digital signal processing optical transceiver 20.

In addition, although in FIG. 2, the multi-lane distribution part 13 at the transmission side and the differential decoder 16 at the reception side are implemented in the OTUk framer 10, they may instead be implemented in the digital signal processing optical transceiver 20.

Further, if lane exchange does not occur between the transmission and reception functions, the lane exchange function in the lane exchange/rotation part 17 can also be omitted.

Second Embodiment

Figure 4:
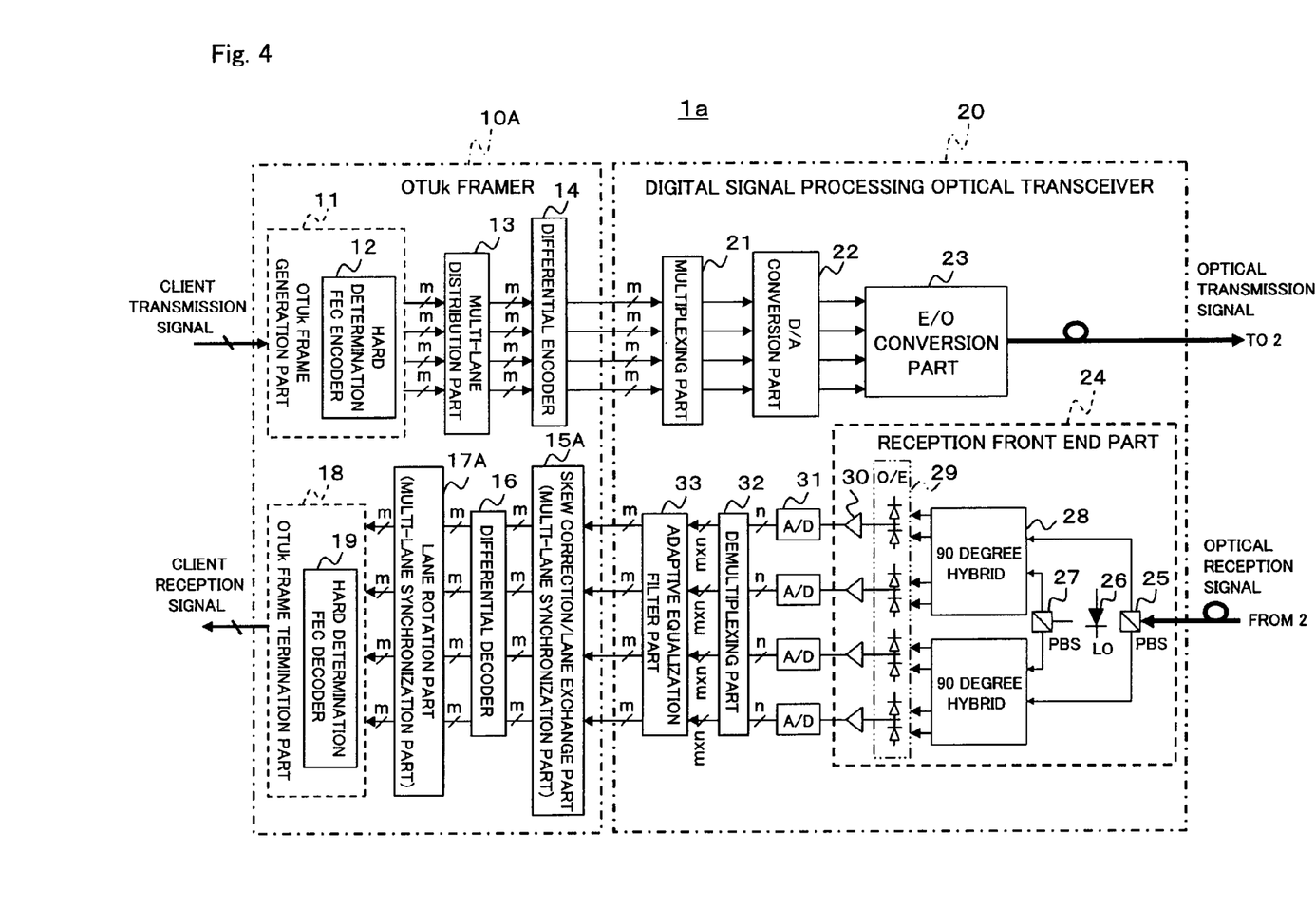
FIG. 4 is a block construction view specifically showing a differential signal optical transmission and reception device according to a second embodiment of the present invention. (Second Embodiment)
Figure 5:
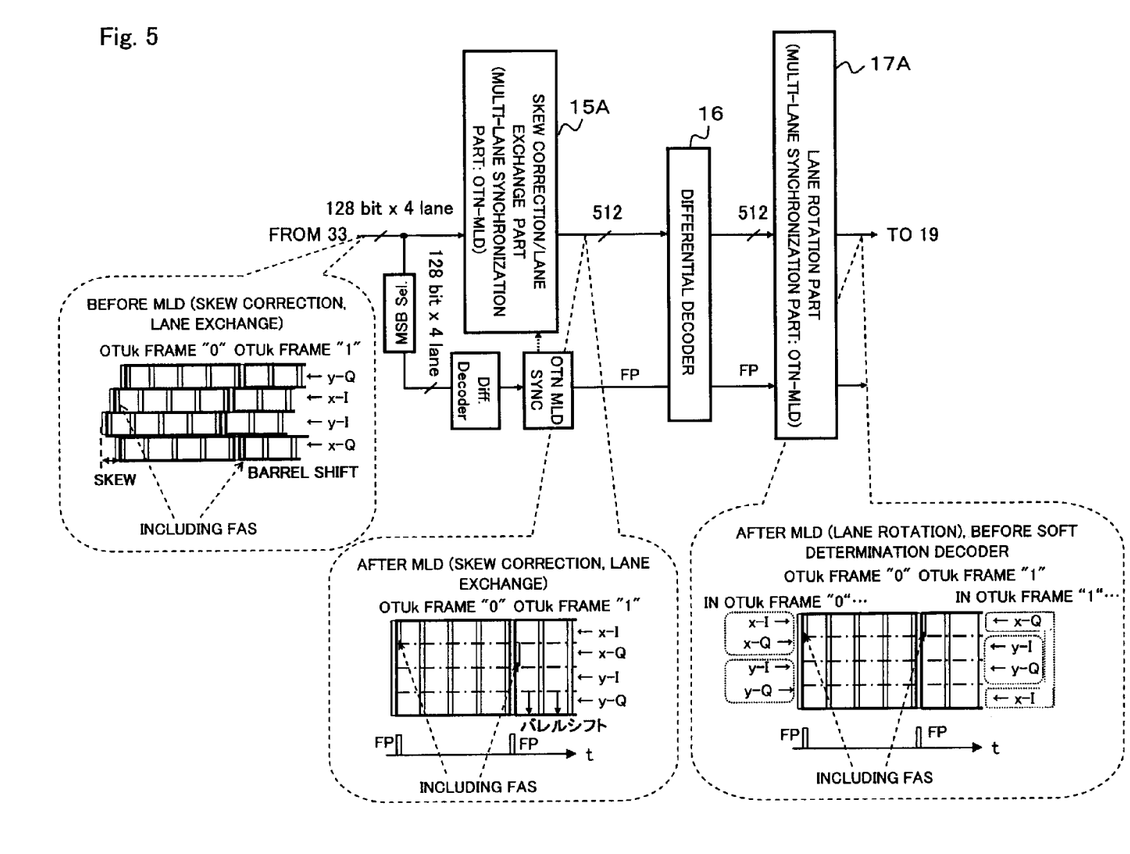
FIG. 5 is an explanatory view showing a reception operation of a multi-lane synchronization part of the differential signal optical transmission and reception device according to the second embodiment of the present invention. (Second Embodiment)

Although in the above-mentioned first embodiment (FIG. 2 and FIG. 3), the lane exchange part (the lane exchange/rotation part 17) is implemented or arranged at the following stage of the differential decoder 16, a lane exchange part (a skew correction/lane exchange part 15A) may be implemented at the preceding stage of the differential decoder 16, as shown in FIG. 4 and FIG. 5.

FIG. 4 is a block construction view specifically showing a differential signal (multi-level modulation) optical transmission and reception device according to a second embodiment of the present invention, wherein those which are similar to the aforementioned ones (see FIG. 2) are denoted by the same reference numerals and characters as those in the aforementioned ones, while omitting a detailed explanation thereof. An OTUk framer 10A in FIG. 4 corresponds to the above-mentioned OTUk framer 10.

FIG. 5 is an explanatory view showing a reception operation of a multi-lane synchronization part of the differential signal optical transmission and reception device according to the second embodiment of the present invention, wherein those which are similar to the aforementioned ones (see FIG. 3) are denoted by the same reference numerals and characters as those in the aforementioned ones, while omitting a detailed explanation thereof.

Here, note that the schematic construction of an optical communication system which uses the differential signal optical transmission and reception device according to the second embodiment of the present invention is as shown in FIG. 1.

In FIG. 4, the skew correction/lane exchange part 15A, which is implemented or arranged at the preceding stage of the differential decoder 16, includes a function of the lane exchange part to restore the lanes of a signal, which have been exchanged with one another in the communication channel 2, the reception front end part 24 and the adaptive equalization filter part 33, to the state of lane arrangement in the transmission state thereof.

The lane rotation part 17A, which is implemented or arranged at the following stage of the differential decoder 16, serves to restore those frames which have been barrel shifted for each OTUk frame in the multi-lane distribution part 13.

In FIG. 5, at the reception side of the multi-level modulation optical transmission and reception device, only skew correction (deskew) and lane exchange of a reception signal in multi-lane synchronization are first carried out, and then, a skew between lanes and exchange of the lanes are corrected, and thereafter, the reception signal thus corrected is inputted to the differential decoder 16.

In the differential decoder 16, lane rotation is not carried out in the units of OTUk frame, so reception can be made in a correct manner. Thereafter, lane rotation is carried out in the lane rotation part 17A, so that the reception signal is restored to the states of the OTUk frames, after which hard determination decoding is carried out.

Here, note that similarly as referred to above, if lane exchange does not occur between the transmission and reception functions, the lane exchange function in the skew correction/lane exchange part 15A can also be omitted.

EXPLANATION OF REFERENCE NUMERALS AND CHARACTERS

1 differential code optical transmission and reception device; 1*a*, 1*b* optical transport devices; 2 communication channel; 10, 10A OTUk framers; 15 skew correction part; 15A skew correction/lane exchange part; 16 differential decoder; 17 lane exchange/rotation part; 17A lane rotation part; 20 digital signal processing optical transceiver; 24 reception front end part; and 29 O/E conversion part.

The invention claimed is:

1. A differential code optical transmission and reception device which is applied to an optical communication system to transmit and receive information data by converting it into an optical signal, and which comprises, at a transmission side thereof: a digital signal processing optical transceiver that converts said information data into the optical signal, and transmits it to a communication channel; and which comprises, at a reception side:

a reception front end part that receives the optical signal from said communication channel;

an O/E conversion part that converts the optical signal received from said communication channel into an electrical signal;

a skew correction part that regulates a skew between lanes contained in said electrical signal;

a differential decoder that decodes a differential code of the electrical signal which has been skew corrected by said skew correction part; and a lane exchange part that rearranges the electrical signal having passed through said differential decoder into a lane state thereof at the time of transmission in cases where lane exchange has occurred in said communication channel.

2. The differential code optical transmission and reception device as set forth in claim 1, wherein said lane exchange part is implemented at a following stage of said differential decoder.

3. A differential code optical transmission and reception device which is applied to an optical communication system to transmit and receive information data by converting it into an optical signal, and which comprises, at a transmission side thereof: a digital signal processing optical transceiver that converts said information data into the optical signal, and transmits it to a communication channel; and which comprises, at a reception side:

a reception front end part that receives the optical signal from said communication channel;

an O/E conversion part that converts the optical signal received from said communication channel into an electrical signal;

a skew correction part that regulates a skew between lanes contained in said electrical signal;

a lane exchange part that rearranges the electrical signal into a lane state thereof at the time of transmission in cases where lane exchange has occurred in said communication channel; and a differential decoder that decodes a differential code of the electrical signal which has been rearranged by said lane exchange part.

4. The differential code optical transmission and reception device as set forth in claim 1, wherein said optical signal is an OTUk (Optical channel Transport Unit-k) frame in which an error correction bit is added to an information bit.

5. The differential code optical transmission and reception device as set forth in claim 2, wherein said optical signal is an OTUk (Optical channel Transport Unit-k) frame in which an error correction bit is added to an information bit.

6. The differential code optical transmission and reception device as set forth in claim 3, wherein said optical signal is an OTUk (Optical channel Transport Unit-k) frame in which an error correction bit is added to an information bit.

* * * * *